Sept. 14, 1954

D. G. C. HARE 2,689,333

MAGNETIC STABILIZATION SYSTEM

Filed March 31, 1944

INVENTOR
Donald G. C. Hare
BY
W. Glenn Jones
ATTORNEY

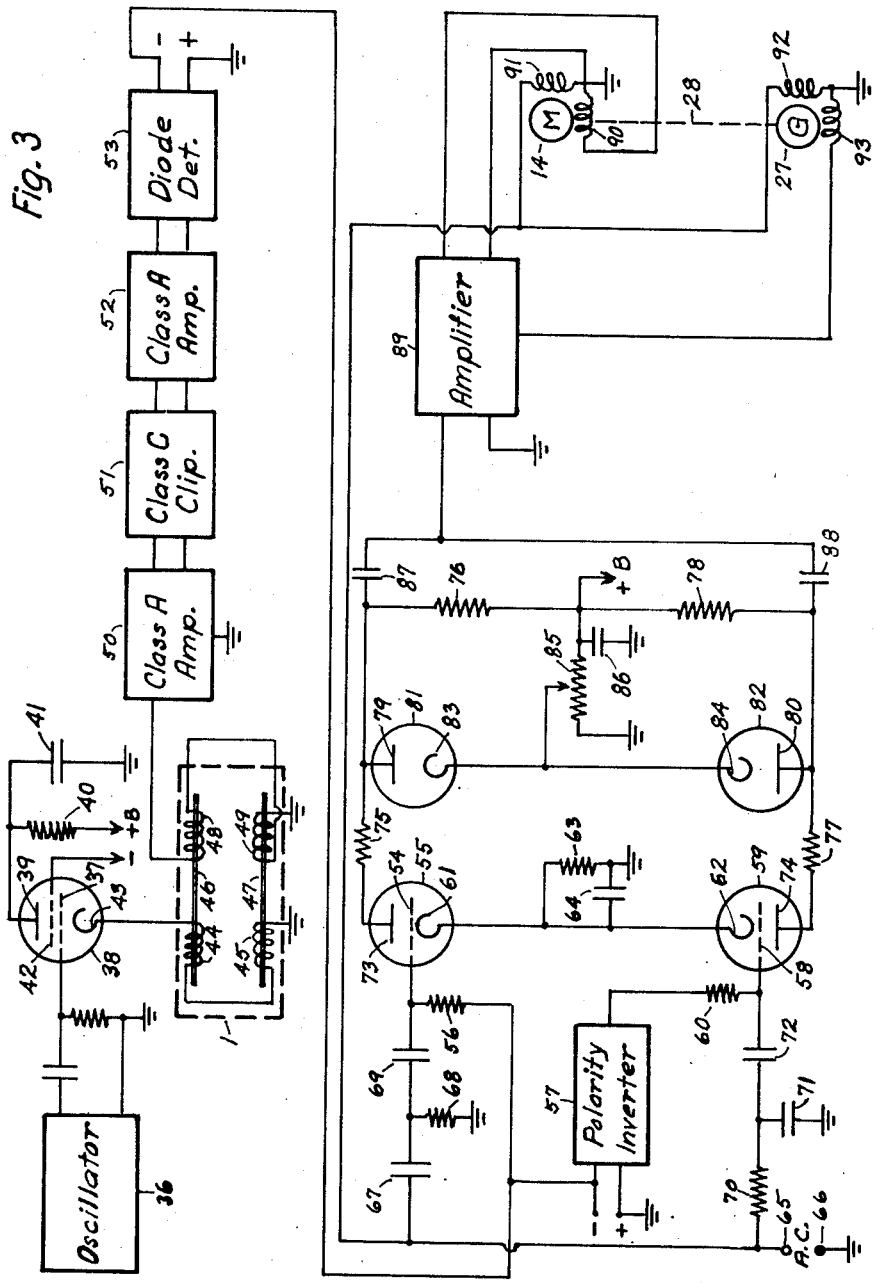

Patented Sept. 14, 1954

2,689,333

UNITED STATES PATENT OFFICE 2,689,333

MAGNETIC STABILIZATION SYSTEM

Donald G. C. Hare, Roslyn, N. Y., assignor to the United States of America as represented by the Secretary of the Navy Application March 31, 1944, Serial No. 529,003

2 Claims. (Cl. 324—43)

This invention relates to a magnetic stabilization system adapted for maintaining a plane substantially perpendicular to a relatively uniform magnetic field, and more particularly to a magnetic stabilization system adapted to maintain the magnetometer element of a portable magnetometer in parallel with the earth's magnetic field.

Various arrangements have been proposed in the past for insuring alignment of the magnetometer element with the earth's magnetic field in spite of movements of the base supporting the magnetometer. One arrangement which has found some application, especially in aircraft, relies upon a pendulum to maintain vertical orientation. This system has the disadvantage that gravitational pull is affected by centrifugal force when the aircraft is maneuvered. Another system proposed for maintaining vertical orientation employs a gyroscope with all the additional complications which such a device entails. Each of these arrangements has the further disadvantage of requiring that the elevation angle of the magnetometer element be readjusted for changes in latitude, since the orientation mechanism assumes the angle between the magnetic axis and the vertical to be fixed.

It is an object of the present invention, therefore, to provide an improved magnetic stabilization system which is completely automatic in operation and which, when used in connection with a magnetometer for measuring the strength of the earth's magnetic field, maintains the magnetometer element in substantially exact alignment with the earth's magnetic field in spite of changes in the position of the base on which it is mounted.

In accordance with the present invention, means are provided for maintaining a plane substantially perpendicular to a relatively uniform magnetic field, and these means comprise first and second magnetometer elements disposed with their axes mutually forming an angle other than zero and at least one at an angle other than 90° to the plane, together with means responsive to the output of the first magnetometer element due to the magnetic field for rotating the plane about a first axis not parallel to the axis of the first magnetometer element, and means responsive to the output of the second magnetometer element due to the magnetic field for rotating the plane about a second axis not parallel to the axis of the second magnetometer element and not parallel to the first axis.

For a better understanding of the invention, together with other and further objects thereof, reference is made to the following description taken in connection with the accompanying drawings, and its scope will be pointed out in the appended claims.

In the accompanying drawings:

Fig. 3 shows, in block and schematic form, one channel of the magnetic stabilization system employed in the magnetometer of Fig. 2.

Figure 1:
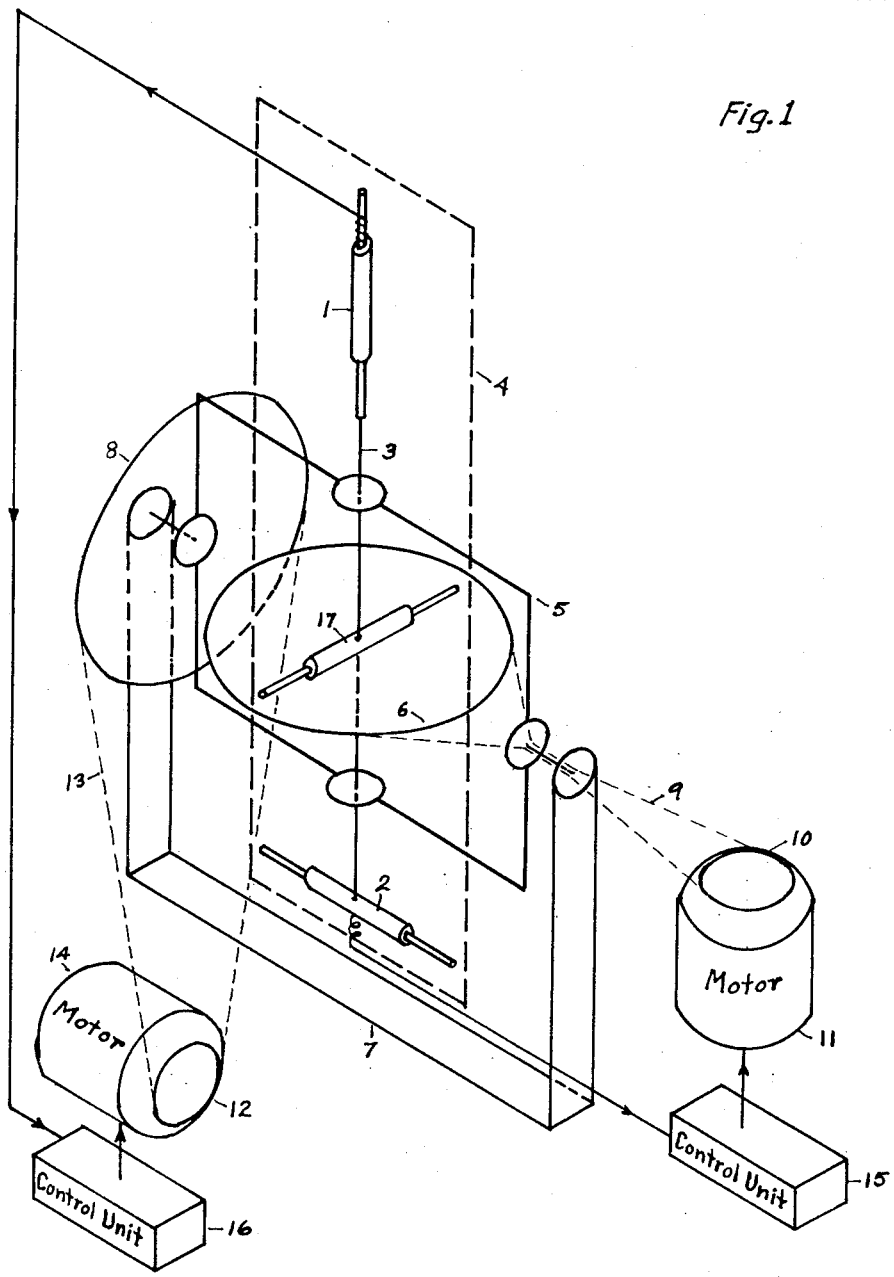
Fig. 1 shows, partly in block form, a magnetic stabilization system in accordance with the present invention.

Referring now more particularly to Fig. 1, there is shown a pair of magnetometer elements 1 and 2 mounted at either end of a shaft or rod 3 with their axes mutually at right angles in an imaginary plane 4. Rod 3 is pivotally mounted in gimbal frame 5 and carries pulley 6. Gimbal frame 5 in turn is pivotally mounted on base 7 in such a manner as to be free to rotate about an axis perpendicular to the axis of rod 3, and has attached to it pulley 8.

Belt 9 engages pulley 6 and pulley 10 which in turn is driven by motor 11. Pulley 8 is driven from pulley 12 by means of belt 13, pulley 12 being in turn driven by motor 14. Motor 11 is energized from control unit 15 which in turn is controlled by magnetometer element 2. Similarly, motor 14 is energized from control unit 16 which is controlled by magnetometer element 1.

By way of example of one particular use to which the system of the present invention may be put, detector magnetometer 17 is shown mounted on pulley 6 in such a position that its axis is perpendicular respectively to the axes of magnetometer elements 1 and 2, and hence perpendicular to plane 4.

In operation, let it be assumed that it is desired to maintain detector magnetometer element 17 parallel with the earth's magnetic field. Since the output of this magnetometer element varies as the cosine of the angle by which it deviates from alignment with the magnetic field, its output will vary only slightly for small angles of deviation, and hence its position in space is relatively non-critical. It will be apparent that, when magnetometer element 17 is parallel with the earth's magnetic field, magnetometer elements 1 and 2 will be disposed with their axes respectively perpendicular to the field. Since the output of a magnetometer element thus disposed is a function of the sine of the angle by which it deviates from true perpendicularity with the field, small deviations in the position of the element will produce relatively large changes in output, and the sense of these output changes will depend on the direction in which the element deviates. Advantage is taken, in accordance with the present invention, of these trigonometric relationships.

While the above-described trigonometric relationships are utilized in a preferred embodiment of the invention, it is within the scope thereof to dispose one of the orienting magnetometers with its axis perpendicular to the plane which in turn is to be maintained perpendicular to the magnetic field. Such an arrangement, while somewhat less sensitive in orientation about one axis, nevertheless has the advantage that a single magnetometer element may be employed simultaneously as the detector magnetometer element and as one of the orienting mangentometer elements.

Referring again to Fig. 1, it will be seen that the output of magnetometer element 1 is utilized, by passing it through control unit 16, to determine the direction in, and extent to, which gimbal frame 5 will be rotated by means of motor 14, pulley 12, belt 13, and pulley 8. Similarly, the output of magnetometer element 2 is utilized, by means of control unit 15, motor 11, pulley 10, belt 9, and pulley 6, to control the direction in, and extent to, which rod 3 will be rotated. In operation, therefore, any deviation from perpendicularity of either of magnetometer elements 1 and 2 immediately causes a movement of the proper direction and extent to restore the magnetometer element to the desired perpendicular position. This in turn insures that detector magnetometer element 17, for example, is maintained parallel with the earth's magnetic field in spite of wide variations in the position of base 7 such as might be caused when base 7 is transported in an airplane or other aircraft.

Figure 2:
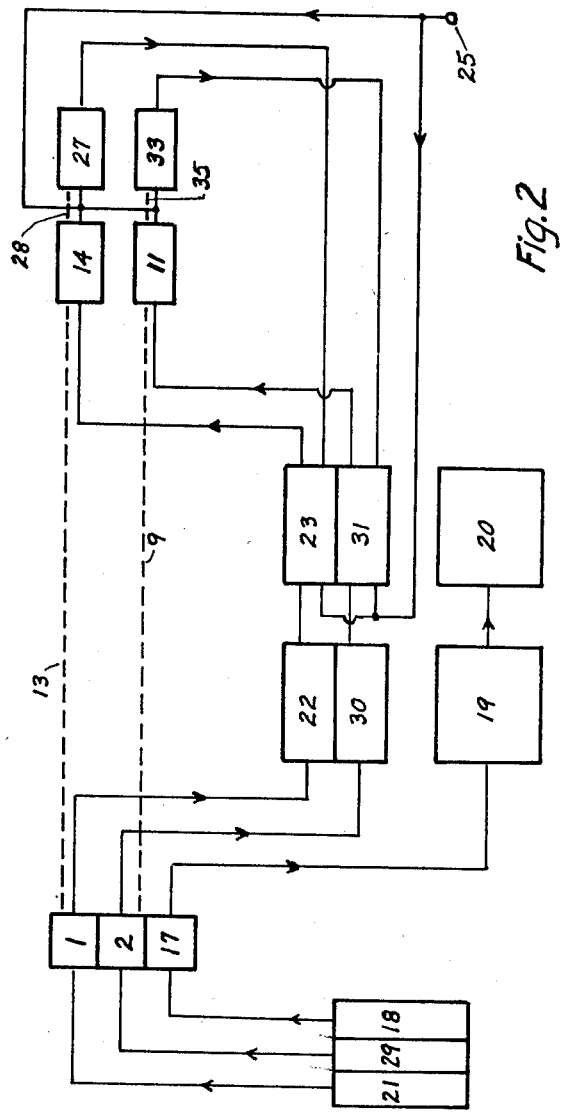
Fig. 2 shows, in block form, a recording magnetometer employing the magnetic stabilization system of the present invention.

Referring now to Fig. 2, there is shown a magnetometer which employs a magnetic stabilization system in accordance with the present invention. Magnetometer elements 1, 2 and 17 have the same relative positions and are mounted as described in connection with Fig. 1. The output of detector magnetometer element 17, which is driven by element driver 18, supplies detector 19, the output of which in turn is fed to recorder 20.

Detector magnetometer element 17 is maintained substantially in alignment with the earth's magnetic field by means of a magnetic stabilization system comprising two substantially identical channels, here designated channel I and channel II. Channel I comprises a magnetometer element 1 which is driven by element driver 21, and the output of which is supplied to D.-C. control unit 22. The latter unit in turn supplies motor-control unit 23, the output of which supplies one winding of two-phase motor 14, the other winding of which is energized from a suitable source of alternating current connected at terminal 25. Motor 14 drives, by means of belt 13, magnetometer element 1, and drives induction generator 27 by means of shaft 28. One winding of generator 27 is supplied from source 25 and the other winding of generator 27 develops a voltage which is supplied to motor-control unit 23.

Channel II comprises element driver 29, magnetometer element 2, D.-C. control unit 30, motor-control unit 31, motor 11, and generator 33.

Motor 11 drives magnetometer element 2 by means of belt 9, and drives generator 33 by means of shaft 35. The output of generator 33 is supplied to motor-control unit 31.

Since channels I and II are substantially identical in construction, their operation is similar. The operation of channel I only will therefore be described by way of example. Element driver 21 supplies a pulsed driving voltage to magnetometer element 1, to produce a pulsed signal the characteristics of which are dependent upon the position of magnetometer element 1 with respect to the earth's magnetic field. This output is supplied to D.-C. control unit 22 which in turn produces a direct-current output voltage dependent in magnitude upon the input signal. Motor-control unit 23, which is responsive to the direct-current output voltage from unit 22, provides a current of suitable phase and magnitude to energize motor 14, which then proceeds to move in the direction and to the extent necessary to restore magnetometer element 1 to a position perpendicular to the earth's magnetic field, in the event that it was not initially so positioned. The function of generator 27 is merely to prevent hunting, by furnishing a voltage which is roughly proportional to the velocity of rotation of motor 14, and which is so utilized in motor-control unit 23 as to counteract the tendency of motor 14 to overrun.

It will be understood that detector 19 and recorder 20 may be of any suitable design for utilizing the output of detector magnetometer element 17 to produce visual or graphical records of small changes in the strength of the magnetic field with which magnetometer element 17 is maintained in alignment. For a better understanding of actual circuit arrangements adapted to accomplish magnetic stabilization in accordance with the present invention, however, there is shown in Fig. 3 a somewhat more detailed circuit arrangement suitable for use as channel I, for example, in the magnetometer of Fig. 2.

Referring now to Fig. 3, there is shown a driver comprising oscillator 36 connected to control grid 37 of thyratron 38, plate 39 of which is supplied from a source of positive potential indicated by B+ through resistor 40. Plate 39 is by-passed to ground by capacitor 41. Screen grid 42 of thyratron 38 is connected to a source of negative potential with respect to ground as indicated by —. Cathode 43 of thyratron 38 is connected to ground through primary windings 44 and 45 of magnetometer element 1.

Magnetometer element 1 comprises a pair of barshaped ferromagnetic cores 46 and 47 which, in addition to carrying respectively primary windings 44 and 45, also carry respectively secondary windings 48 and 49. The latter windings are connected in series as shown in the input circuit of class A amplifier 50. The output of amplifier 50 is supplied to clipper 51 which comprises a vacuum tube operating in class C. The output of clipper 51 is amplified by class A amplifier 52 and rectified by diode detector 53, to produce a direct-current voltage of the polarity indicated and having a magnitude dependent upon the strength of the magnetic field surrounding magnetometer element 1.

The output voltage of detector 53 is applied without change in polarity to control grid 54 of vacuum tube 55, by means of resistor 56. The output voltage of detector 53 is also supplied to polarity inverter 57, the output of which is applied to control grid 58 of vacuum tube 59 by means of resistor 60.

Cathodes 61 and 62, respectively of vacuum tubes 55 and 59, are connected together and are connected to ground through resistor 63 shunted by capacitor 64.

A source of alternating current is connected to terminals 65 and 66. This voltage is applied, approximately in leading quadrature, to control grid 54 of vacuum tube 55, by means of capacitor 67 and resistor 68, through capacitor 69. Similarly, the alternating-current voltage present at terminals 65 and 66 is applied to control grid 58 of vacuum tube 59 in lagging quadrature, by means of resistor 70 and capacitor 71, through capacitor 72.

Plates 73 and 74, respectively of vacuum tubes 55 and 59, are connected to a source of positive potential indicated by B+ respectively through series-connected resistors 75 and 76, and resistors 77 and 78. The junctions of resistors 75 and 76 and of resistors 77 and 78 are connected respectively to plates 79 and 80 of diode rectifiers 81 and 82. Cathodes 83 and 84, respectively of rectifiers 81 and 82, are connected together and to the movable arm of potentiometer 85, which is connected between ground and B+, the latter point being by-passed to ground by capacitor 86.

The junctions of resistors 75 and 76 and of resistors 77 and 78 are also connected, respectively through capacitors 87 and 88, together and to the input of amplifier 89. The output of amplifier 89 supplies winding 90 of two-phase motor 14, the other winding 91 of which is connected to terminals 65 and 66. Motor 14 directly drives, by means of a shaft diagrammatically indicated by broken line 28, induction generator 27. Winding 92 of generator 27 is connected to terminals 65 and 66, and winding 93 has one terminal grounded and the other terminal connected to amplifier 89.

In operation, oscillator 36 causes thyratron 38 periodically to become conductive and thus to permit the sudden discharge of capacitor 41, which is recharged through resistor 40 as soon as thyratron 38 is rendered non-conductive. The periodic pulses in the current which flows through thyratron 38 produce magnetizing forces in cores 46 and 47 of magnetometer element 1, of sufficient magnitude to carry these core members beyond magnetic saturation. As a result, a pulsed-signal voltage is induced in secondary windings 48 and 49, the exact characteristics of which are a function of the strength of the magnetic field surrounding magnetometer element 1. After these signal pulses have been amplified by amplifier 50, they are clipped by clipper 51, further amplified by amplifier 52, and rectified by rectifier 53.

The output voltage of detector 53 is utilized to control the amplification of vacuum tubes 55 and 59 in opposite senses, due to the operation of polarity inverter 57. For example, let it be assumed that the output voltage of detector 53 has the value which corresponds with zero magnetic field surrounding magnetometer element 1. In this case, the direct-current voltage applied to control grids 54 and 58 will be such that both of tubes 55 and 59 are rendered substantially inoperative. Now let it be assumed that the output voltage of detector 53 increases in magnitude. Such an increase will merely bias control grid 54 of vacuum tube 55 more negatively, so that this tube remains substantially inoperative. On the other hand, due to the change in polarity which occurs in polarity inverter 57, an increase in the negative-output voltage of detector 53 will shift the bias voltage applied to control grid 58 of vacuum tube 59 in a positive direction, thereby rendering this tube operative. It will be obvious that a decrease in the output voltage of detector 53 will have the opposite effect, namely to maintain vacuum tube 59 substantially inoperative while rendering vacuum tube 55 operative.

Assuming for the moment that vacuum tube 55 is operative, the alternating-current voltage which is applied to control grid 54 in leading phase relationship with respect to the alternating-current voltage at terminals 65 and 66 will be amplified by vacuum tube 55 and supplied to amplifier 89, which in turn will energize winding 90 of motor 14 causing it to rotate in a given direction. It will be apparent that, had vacuum tube 59 instead of vacuum tube 55 been rendered operative, the alternating-current voltage supplied to amplifier 89 and hence to winding 90 would have been lagging in phase with respect to the alternating-current voltage at terminals 65 and 66, with the result that the motor would have rotated in the opposite direction.

Diode rectifiers 81 and 82 function as limiters to prevent overloading of amplifier 89 due to input-voltage peaks which might result from sudden changes in the operativeness of vacuum tubes 55 and 59. The point at which this limiting action begins is determined by the setting of potentiometer 85.

The purpose of generator 27 is to minimize hunting. It is apparent that the voltage developed in winding 93 of generator 27 will be roughly proportional to the velocity of rotation of motor 14. This voltage is supplied to amplifier 89 and so utilized within this unit as to counteract the tendency of motor 14 to overrun and hence to hunt. A mode of minimizing hunting which can be used is shown by the U. S. patent to Riggs 2,115,086. Many other arrangements for accomplishing the damping purpose will be clear to those skilled in the art. However, one manner that was used is to couple the generator output degeneratively to the same grid of amplifier 89 to which the output of tubes 81 and 82 are fed, both the latter output and that of the generator being fed through isolaing resistors (not shown).

In one successful embodiment of the invention, oscillator 36 operated at 200 cycles per second. The voltage at terminals 65 and 66 had a frequency of 60 cycles per second. Thyratron 38 was type 2050. Vacuum tubes 55 and 59 comprised a type 6N7 tube; and diode rectifiers 81 and 82, a type 6H6 tube. The following values of resistors and capacitors were employed:

| | | |
|---|---|---|
| Capacitors 40, 67, 71, 87 and 88 | microfarads | 0.1 |
| Capacitors 69 and 72 | do | 0.01 |
| Capacitors 64 and 86 | do | 10.0 |
| Resistor 39 | ohms | 50,000 |
| Resistor 68 | do | 2,500 |
| Resistors 56 and 60 | megohms | 0.5 |
| Resistor 70 | do | 0.25 |
| Resistor 63 | ohms | 1,500 |
| Resistors 75 and 77 | megohms | 0.15 |
| Resistors 76 and 78 | do | 0.1 |
| Potentiometer 85 | ohms | 10,000 |

It will be understood that tube types and component values different from those stated above may be employed without departing from the scope of the invention. For example, separate vacuum tubes may be employed instead of double triodes and double diodes such as those mentioned above by way of example.

In the description and drawings of the present invention, it has been assumed for simplicity of explanation that the magnetometer elements, both for detection and for orientation, are of the type employing a relatively slender longitudinal bar of core material. It is to be understood, however, that the invention may be employed equally successfully in systems using magnetometer elements of other types, as for example the type which employs a rotating coil without a ferromagnetic core. When magnetometer elements of such other types are employed, they are preferably disposed with their axes so positioned that the detector magnetometer element will have a relatively uncritical position and the orienting magnetometer elements relatively critical positions. The exact physical arrangement necessary to carry out this requirement depends upon the particular type of magnetometer elements which are employed, and the proper arrangement will be readily apparent to those skilled in the art, in the light of the present disclosure. The substitution of such other types of magnetometer elements with the corresponding necessary changes in their relative positions, therefore, falls within the scope of the present invention.

In order that this disclosure may clearly be understood to specifically encompass such alternative arrangements, the expression "axis of magnetometer element" is declared to be used herein to mean that axis of the magnetometer element to which a given magnetic field must be parallel in order to produce the maximum response from the magnetometer element.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

Having thus fully described my invention, I claim:

1. In a circuit for stabilizing a magnetometer element in a magnetic field, comprising in combination a magnetometer element for generating a potential proportional to any deviation from said magnetic field, oscillator driving means for said magnetometer, amplifying and detecting means connected to receive said potential and to supply an output signal having an amplitude and polarity dependent upon the amount and direction of deviation, respectively, means responsive to the polarity of the generated potential for determining the direction of stabilization, said last mentioned means comprising electron discharge devices having cathodes, grids and plates with their cathodes connected to each other and to ground, the grid of one of the electron discharge devices being connected to the output signal from the detecting and amplifying means, a polarity inverter, the grid of the other electron discharge device being connected through the polarity inverter to said output signal, a source of alternating voltage, said alternating voltage also being applied to each of said grids in a predetermined phase relationship, and a second amplifier, the output from the plates of the electron discharge devices being connected to said second amplifier, a reversible stabilizing motor connected to the output of said second amplifier, said motor being mechanically linked to said magnetometer element for moving said magnetometer relative to the magnetic field in response to the potential generated in response to the deviation of said magnetometer from said magnetic field.

2. In a circuit as set forth in claim 1, generating means coupled to said stabilizing motor and supplying a potential which is proportional to the speed of rotation of the stabilizing motor, the output of said generating means being connected to said second amplifier degeneratively to decrease the output signal supplied from said amplifier to said stabilizing motor means to thereby prevent hunting of the stabilizing motor.

References Cited in the file of this patent

UNITED STATES PATENTS

| Number | Name | Date |
|---|---|---|
| Re. 23,066 | Moseley | Dec. 21, 1948 |
| 1,943,850 | Truman | Jan. 16, 1934 |
| 1,988,458 | Minorsky | Jan. 22, 1935 |
| 2,027,393 | McCreary | Jan. 14, 1936 |
| 2,047,609 | Antranikian | July 14, 1936 |
| 2,115,086 | Riggs | Apr. 26, 1938 |
| 2,213,357 | Barth | Sept. 3, 1940 |
| 2,257,203 | Thacker | Sept. 30, 1941 |
| 2,257,757 | Moseley | Oct. 7, 1941 |
| 2,334,469 | Alexandersson et al. | Nov. 16, 1943 |
| 2,406,870 | Vacquier | Sept. 3, 1946 |
| 2,412,612 | Godet | Dec. 17, 1946 |
| 2,468,554 | Hull | Apr. 26, 1949 |
| 2,468,968 | Felch et al. | May 3, 1949 |
| 2,555,209 | Vacquier et al. | May 29, 1951 |